R. FOUNTAIN, J. K. WATERS & W. C. WINCHESTER.
FRUIT GATHERER.
APPLICATION FILED APR. 9, 1913.
1,132,325.
Patented Mar. 16, 1915.
4 SHEETS—SHEET 1.
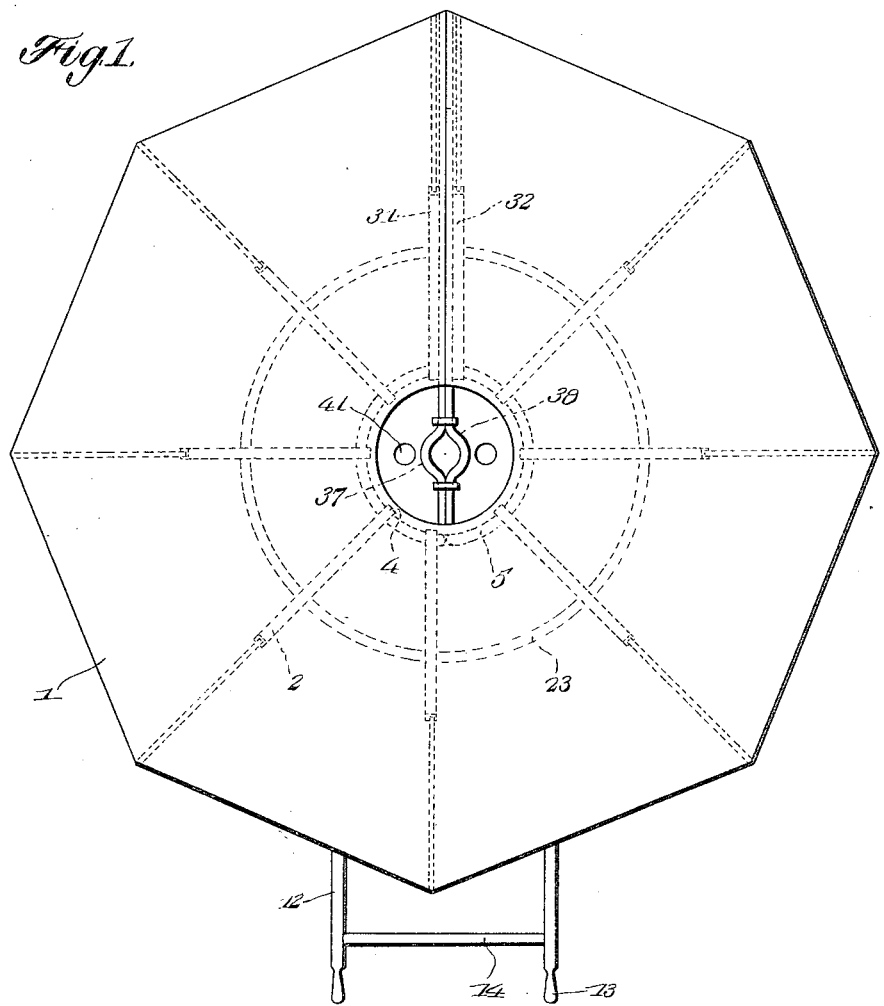
Witnesses
Inventors
Robert Fountain,
John K. Waters and
Winfred C. Winchester.
By Victor J. Evans
Attorney R. FOUNTAIN, J. K. WATERS & W. C. WINCHESTER.
FRUIT GATHERER.
APPLICATION FILED APR. 9, 1913.
1,132,325.
Patented Mar. 16, 1915
4 SHEETS—SHEET 2.
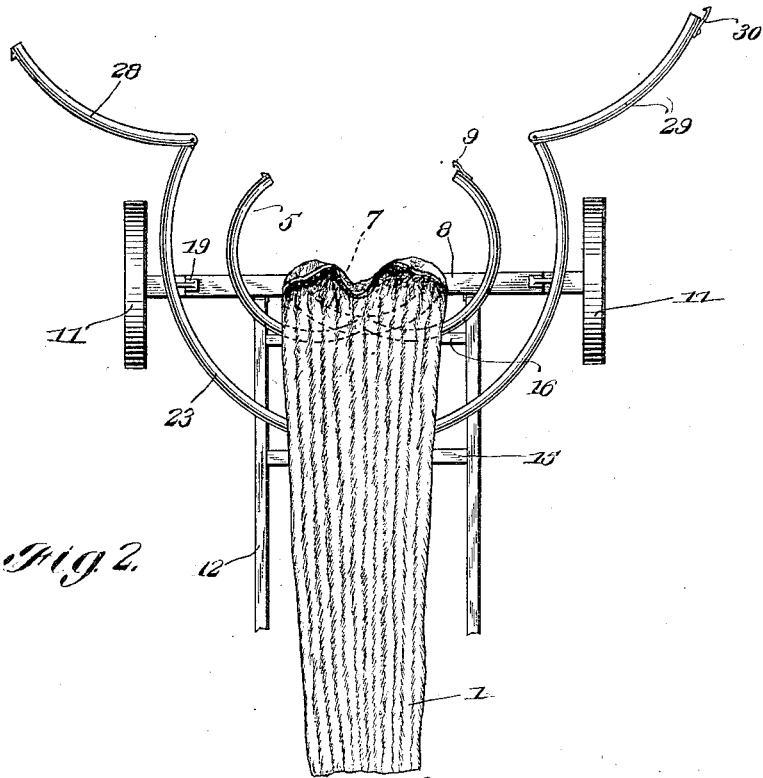
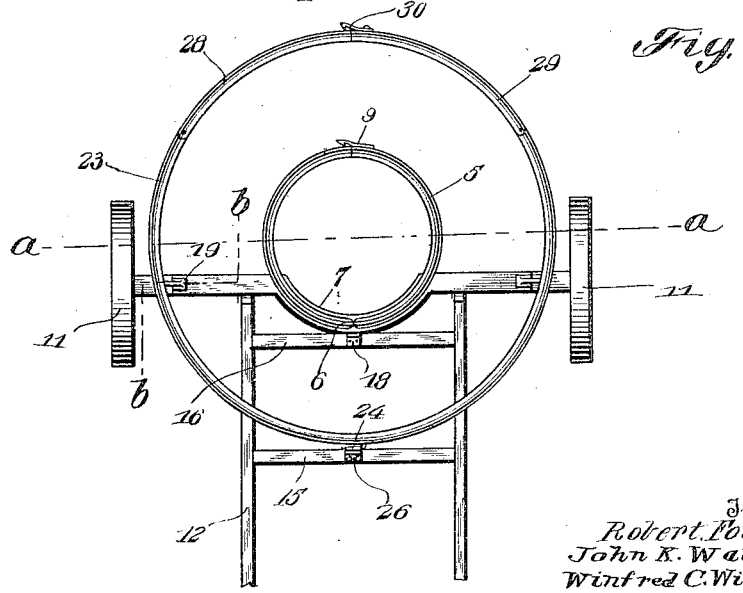

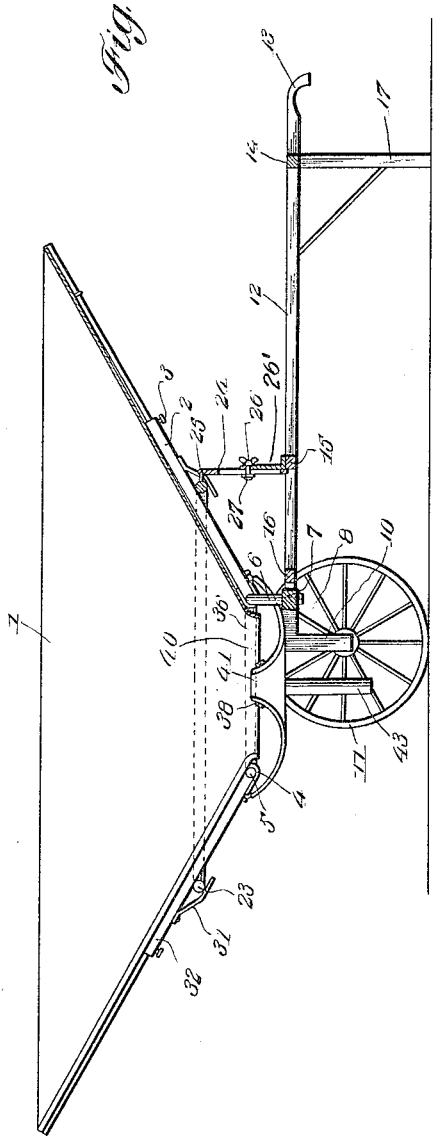

R. FOUNTAIN, J. K. WATERS & W. C. WINCHESTER.
FRUIT GATHERER.
APPLICATION FILED APR. 9, 1913.
1,132,325.
Patented Mar. 16, 1915.
4 SHEETS—SHEET 4.
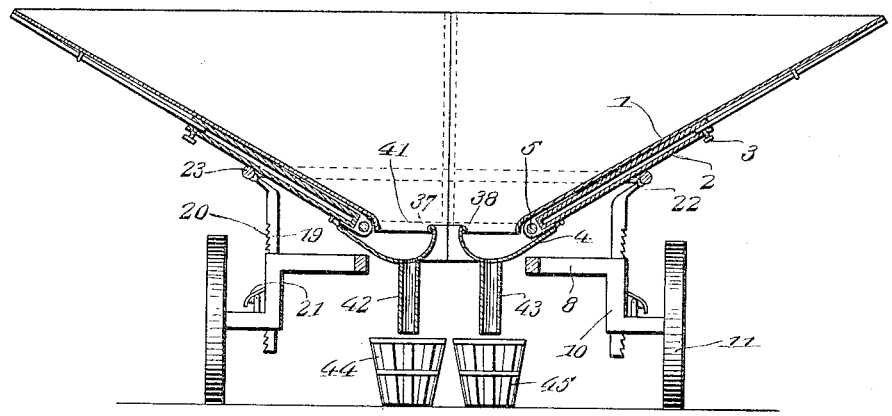
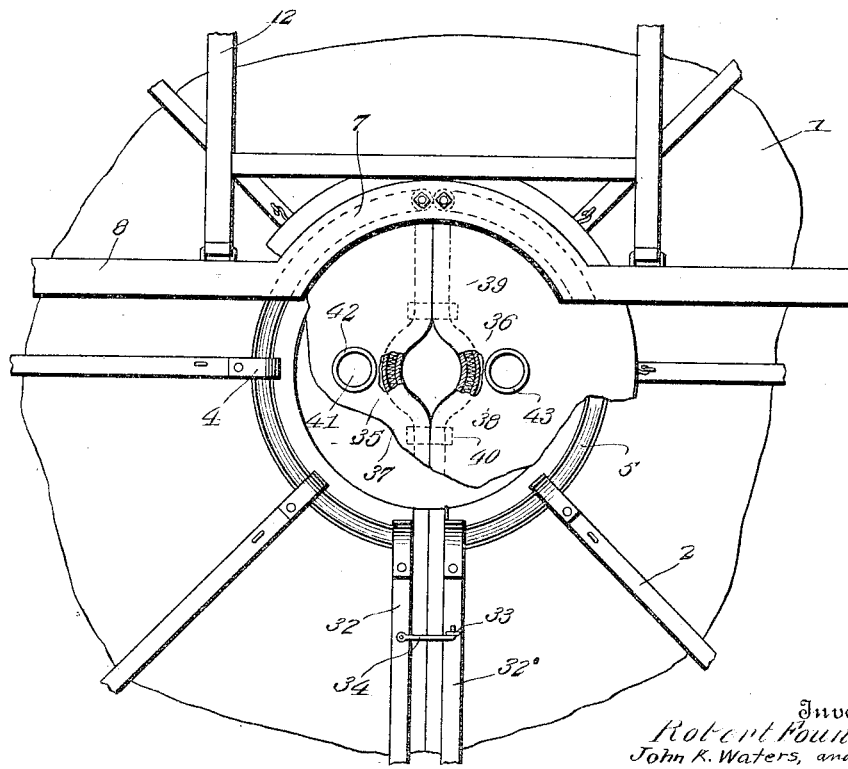

UNITED STATES PATENT OFFICE.

ROBERT FOUNTAIN, JOHN K. WATERS, AND WINFRED C. WINCHESTER, OF BANNING, CALIFORNIA.

FRUIT-GATHERER.

1,132,325.  Specification of Letters Patent.  Patented Mar. 16, 1915.

Application filed April 9, 1913. Serial No. 760,086.

*To all whom it may concern:*

Be it known that we, ROBERT FOUNTAIN, JOHN K. WATERS, and WINFRED C. WINCHESTER, citizens of the United States, residing at Banning, in the county of Riverside and State of California, have invented new and useful Improvements in Fruit-Gatherers, of which the following is a specification.

The present invention relates to means for gathering fruit, and has for its object to provide an appliance which may be readily transported in the orchard from one tree to another and quickly placed in position around a tree so as to collect fruit shaken from the limbs, and which may be easily and quickly folded and disconnected from the tree so as to be readily applied to the next tree whose fruit is to be collected.

The invention also has for its object to supply a gatherer mounted upon a truck comprising a textile body of approximately funnel-shape and strengthened by placing arms which are sustained at a desired elevation upon a suitable support so that the body may be spread or elevated more or less to suit the nature of the tree whose fruit is to be gathered.

It is a further object of the invention to provide a gatherer comprising a textile body which is connected with a plurality of reinforcing as well as supporting arms or braces, and to provide the braces with a suitable support which may be adjusted to spread or elevate the body more or less to suit the nature of the tree whose fruit is to be gathered, and to retain the gatherer horizontally of the tree irrespective of the undulations of the ground in which the tree is planted.

A still further object of the invention is to supply a gatherer mounted upon a truck comprising a textile body which is supported by ribs or arms, similar to those of an umbrella and which may be folded or opened to a desired degree to suit the nature of the tree whose fruit is to be gathered, the said ribs and arms being loosely arranged upon a ring member carried by the truck and being supported by a second adjustable ring member which is also carried by the truck, so that the ribs or arms may be swung or rotated upon the lower supporting ring member one against the other to sustain the textile body in a folded condition, the ribs or arms being each formed with a stay or guard member which engages with the second ring, so that none of the said arms can be accidentally brought out of engagement with the said ring, and whereby the body, when arranged around the tree will remain in proper position without danger of accidental collapse incident to the blowing of the wind etc.; the rings being further provided with curved members which correspond with the shape of the said rings, and which permit of the gatherer being properly arranged around the tree.

The invention further consists in the novel features, details of construction and combination of parts which hereinafter will more fully be set forth, illustrated in the accompanying drawings, and pointed out in the appended claims.

Referring to the drawings forming part of the specification: Figure 1 is a top plan view of the gatherer as it appears in position for gathering fruit, Fig. 2 is a similar view but showing the gatherer folded and the gates of the supporting members open to a position for arranging the device around the trunk of a tree, Fig. 3 is a rear elevation of the gatherer when in operative position. Fig. 4 is a central longitudinal sectional view through the device illustrated in Fig. 3, Fig. 5 is a top plan view, the textile body and supporting ribs being removed, Fig. 6 is a transverse sectional view upon the line *a—a* of Fig. 5, Fig. 7 is a detail bottom plan view, and Fig. 8 is an enlarged detail sectional view taken approximately upon the line *b—b* of Fig. 5.

Corresponding parts are referred to in the following description and indicated in all of the views of the drawings by the same reference characters.

The gatherer proper comprises a body 1 of textile material, such as stout canvas, duck or burlap. The textile material is cut round and is provided with a V-shaped incision which reaches from one of its edges a slight distance beyond its center, so that when the edges are brought together the gatherer assumes a funnel shape.

The textile body 1 is supported by a series of braces or ribs 2. Each of the ribs 2 comprises a pair of members, the outer member of each of the said ribs being telescopic or longitudinally adjustable with relation to the inner member, and the said outer member is sustained in a proper adjusted relation to the inner member through the medium of a thumb screw 3. The ribs 2 have their inner ends terminating at a suitable distance away from the center of the body 1, but the ends of the ribs are arranged concentric of the said center.

The inner ends of the ribs are provided each with an eye 4, and the said eyes are arranged upon a ring member 5. The ring 5 comprises a pair of semi-circular members. The opposite ends of each of the said members at, what we will term the rear portion of the ring, is bent downwardly to provide pivot members or arms 6, and these arms are rotatably mounted upon a central inwardly curved member 7 of an axle 8.

One of the sections of the ring member 5, at the opposite end of the said section, is provided with a spring catch 9 which co-acts with the opposite or adjacent section and which normally retains the sections closed upon each other.

The axle 8 has its longitudinally extending portions provided at their ends with downwardly extending members 10, and have their extremities offset to provide the spindles for the wheels 11. The axle, it will thus be noted, is substantially U-shaped, and the upper or connecting member of the same is provided adjacent its central rounded portion 7 with a pair of shafts 12. The shafts extend a suitable distance beyond the textile body 1, and have their ends formed with handles 13, whereby the device may be manually propelled. The shafts are provided with a plurality of connecting members 14, 15 and 16 respectively, and secured to the shafts adjacent their connecting member 14 are leg members 17, the same being suitably braced to the said connecting member 14 as well as to the underfaces of the shafts. The connecting member 16 is arranged below the central curved portion 7 of the axle, and is provided with a brace member 18 which is also connected centrally to the underface of the curved portion 7 of the axle, and which materially assists the axle in sustaining the ring 5 as well as the ribs 2 and the textile body 1.

Before proceeding further with the description, it will be noted that by providing the ribs 2 with the eyes 4, the said ribs may be caused to travel around the ring 5 in the direction of its pivots 6, so that the said body may be sustained in a folded condition.

The angular vertical portions 10 of the axle 8 have their outer faces channeled, and each of said channels communicates with a rectangular opening provided in the lower laterally extending portions of the axle upon which the wheels 11 are mounted. Arranged within each of the channels in the members 10 and passing through each of said openings is an elongated member 19 which is rectangular in cross section. Each of the members 19 has its outer face formed with transverse teeth 20 which are adapted to be engaged by a spring pressed dog 21 provided upon the lateral extensions or spindles in the axle. Each of the members 20 has its upper extremity rounded outwardly and loosely connected, as at 22, to a ring member 23, the said ring being of a greater circumference than the ring 5. The ring 23 serves as a rest or support for the ribs 2, and as the said ring is, through the medium of the members 20 (and the pawls 21) vertically adjustable, the said ribs 2 may be swung angularly of the ring 5 to what may termed an open or a closed position, and thus partially close or open the textile body 1. The loose joint 23 permits of the independent adjustment of either of the members 19, so the ring may be tilted if desired to arrange the body 1 at a desired angle with relation to the tree which it surrounds or with relation to an undulating ground surface near the tree.

Conditions may arise whereby it is desirable to tilt the textile body at an angle from the connections 22 between the members 19 and the loose connections or joints and so we provide the ring 23, central with respect to the connections 22, and at the rear portion of the said ring with a bail 25 which serves as a hinge connection for a plate 24, the said plate being provided with an elongated slot. The numeral 26' designates a vertically disposed plate which is secured to one of the connecting members of the shafts 12, the same having a round opening through which passes the stem of a headed bolt 27, the said stem also passing through the slot in the head 24, the head contacting with the rear face of the rail while a thumb nut 26 co-acts with the bolt to compress the plate 24 against the plate 26'. The adjustment of the plate 24 upon the plate 26' permits of the tilting of the ring 23 upon the loose joints 22, and the nut and bolt provides means for sustaining the ring and body in such position.

In order to permit of the textile body being arranged around the trunk of a tree the ring 23 is made up of three segments, the main segment comprising approximately three-fourths of a circle and it is upon this segment that the bail 25 and the plate 24 are provided. The remaining sections of the ring are indicated by the numerals 28 and 29, each of which being pivotally connected to the main or registering section, and as the said sections 28 and 29 may be swung to an open position, when the textile body is to be arranged around the tree or to a closed position to complete the ring and close the body when the same is properly positioned, the said portions 28 and 29 will hereinafter be referred to as the gates. The gate 29 has its end provided with a spring latch 30 which is adapted to engage with the gate 28 to retain the gates closed upon the main sections of the ring.

It is essential that the textile body be not influenced by the wind or otherwise subjected to accidental collapse or folding. To provide for this, each of the lower sections of the ribs has secured thereto a spring plate 31 which is adapted to frictionally contact with the underface of the ring 23, as clearly shown in Figs. 3 and 4 of the drawings. It is to be understood that the outer edge of the textile body 1 is secured to the ends of the outer sections of the ribs 2, and for the sake of convenience the end ribs are indicated by the numerals 32 and 32', and it is to these ribs that the inner or adjacent edges of the textile body 1 are connected. The rib 32' is provided with spaced eyes 33 which are adapted to be engaged by the hooks 34 which are loosely secured upon the rib 32. This connecting means prevents the separation of the overlapping ends of the textile body, as will be readily understood. In the showing in the drawings, the textile body 1 has its inner and central portion disposed within the ring 5, and, if desired, a second textile body 35 may be provided. The body 35 is secured to the underfaces of the inner members of the ribs. This body 35 which may be termed the bottom of the device is bowl-shaped and is slitted longitudinally from a point near its center (see Fig. 7). The meeting edges of the bottom are folded over a flexible element, preferably in the nature of a helical spring 38, and the rings thus formed upon the said edges provide for the reception of spring clips 40 which are removable and adjustable so that the central portion of the bottom may be brought into snug engagement with the trunk of a tree when the device is set up to gather fruit from the tree. The bottom is provided with openings 41 which are surrounded by outlet chutes 42 and 43 that deliver to suitable receptacles 44 and 45.

When the device is positioned around a tree, it will be noted that by vigorously shaking the tree or the branches thereof, the fruit is dislodged and dropping upon the gatherer is directed to the opening 41 and from thence directed through the chutes 42 and 43 to the receptacles 45. After the tree has been stripped, the ribs and textile body are folded to the position illustrated in Fig. 2, the gates 28 and 29 being swung open, as are also the sections of the ring 5, thereby admitting the backing of the truck so as to disengage the gatherer from the tree, after which the device may be placed in position around the next tree to be stripped of its fruit. The construction is such that when the gatherer is not required for immediate use, it may be entirely removed from the truck and rings and folded into compact form so as to be stored and to occupy a minimum amount of space, while a platform may be arranged upon the top ring 23 and the truck employed for other purposes.

From the above description, taken in connection with the accompanying drawings, the advantages of the construction and the method of operation may be readily apparent to those skilled in the art to which such invention may appertain, and while we have described the preferred operation of the invention together with the device which is merely considered to be the embodiment thereof, we desire to have it understood that the device shown is merely illustrative, and that such changes may be made when desired as are within the scope of the claims appended thereto.

Having thus described the invention, what we claim is:

1. In combination with a wheeled truck or frame, a series of telescopic ribs pivotally and slidably arranged upon the frame, a textile body having overlapping ends connected with the ribs, a bowl-shaped textile bottom also connected to the ribs, said bottom comprising a slitted member, a flexible element connected with the edges provided by the slit, clamps engaging with the said edges, and an adjustable support for the ribs.

2. In combination with a wheeled truck or frame, of a split ring pivotally connected with the frame, a catch member for securing the ends of the ring, a series of ribs having their ends provided with eyes arranged upon the rim, a textile body supported by the ribs, and an adjustable support carried by the frame and engaging the ribs.

3. In combination with a wheeled supporting truck or frame, of a split ring member having two of its ends pivotally connected with the truck or frame, a spring member for normally locking the sections of the ring, telescopic members arranged upon the rib, means for securing the members of the ribs in adjusted position, a textile body secured to the ribs, and an adjustable support arranged upon the truck or frame for the ribs.

4. In combination with a wheeled truck or frame, a ring comprising two semi-circular sections having one of their ends pivotally connected with the truck or frame, a latch for connecting the free ends of the sections, rib members, each of said rib members having its inner end provided with an eye which is arranged upon the sectional ring, a textile body connected with the ribs, said body having overlapping edges, an adjustable support for the ribs carried by the truck, and pivoted gates connected with said support.

5. In combination with a wheeled truck or frame, a split ring, the sections of the ring each having one of its ends pivoted to the truck or frame, a spring catch for connecting the opposite ends of the ring, rib members having eyes which are arranged upon the ring, a textile body for the ribs, an adjustable support upon the truck or frame, said support including a ring section having pivoted curved gate members which when swung together, complete the ring, and means for locking the gate members.

6. In combination with a truck or frame, a spring ring member having two of its ends pivotally connected with the truck or frame, a latch for the opposite ends of the ring member, a series of ribs having one of their ends provided with eyes arranged upon the split ring, a textile body having overlapping ends connected with the ribs, a support for the ribs, said support comprising a ring member provided with rounded pivoted gate members which, when swung together, form a complete circle, a spring catch for the pivoted members of the ring, independent vertically adjustable members loosely connected with the ring segment and supported upon the frame or truck, and a longitudinally adjustable member hingedly connected with the ring segment and secured to the frame or truck.

7. The combination with a wheeled truck or frame which includes an axle which has downturned ends provided with spindles to which the wheels are attached, the horizontal member of the axle being centrally curved, a sectional ring member having its ends pivotally connected with the curved portion of the axle, a catch for the opposite ends of the ring, a series of rib members having their ends provided with eyes and arranged upon the ring, a textile body which is slitted from approximately its center to one of its edges secured upon the ribs, a supporting ring underlying the ribs, said ring including pivoted gates, locking means for the gates, the downturned members of the axle being channeled, a member having an outer toothed face arranged within each of the channels, a dog carried by the axle and adapted to co-act with the teeth of the said member, a loose connection between the said members and the supporting ring, a slotted member hingedly connected centrally to the rear of the said supporting ring, a plate arranged upon the frame and adapted to be contacted by the hinged slotted member, means passing through the said plate and slot of the hinge member for sustaining the hinge member adjustable to said plate, and spring plates connected with the ribs and frictionally engaging with the outer face of the supporting ring.

In testimony whereof we affix our signatures in presence of two witnesses.

ROBERT FOUNTAIN.
JOHN K. WATERS.
WINFRED C. WINCHESTER.

Witnesses:
R. M. ECKMAN,
J. M. FORQUER.

Copies of this patent may be obtained for five cents each, by addressing the "Commissioner of Patents, Washington, D. C."